US012719509B2

(12) United States Patent
Merk et al.

(10) Patent No.: US 12,719,509 B2
(45) Date of Patent: Aug. 25, 2026

(54) FOUR-PORT DIPLEXER DEVICE

(71) Applicant: LISA DRÄXLMAIER GMBH, Vilsbiburg (DE)

(72) Inventors: Thomas Merk, Stuttgart (DE); Ievgen Bilogurov, Sindelfingen (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 278 days.

(21) Appl. No.: 18/446,955

(22) Filed: Aug. 9, 2023

(65) Prior Publication Data

US 2023/0403035 A1 Dec. 14, 2023

Related U.S. Application Data

(63) Continuation of application No. PCT/EP2021/053054, filed on Feb. 9, 2021.

(51) Int. Cl.
*H04B 1/00* (2006.01)
*H04B 1/30* (2006.01)

(52) U.S. Cl.
CPC ............. *H04B 1/0057* (2013.01); *H04B 1/30* (2013.01); *H04B 2001/307* (2013.01)

(58) Field of Classification Search
CPC ................................ H04B 1/0057; H04B 1/30
See application file for complete search history.

(56) References Cited

U.S. PATENT DOCUMENTS

2013/0271237 A1 10/2013 Barth
2020/0343647 A1* 10/2020 Runyon ................. H01Q 19/17

FOREIGN PATENT DOCUMENTS

CN 107293832 A 10/2017
KR 101514155 B1 4/2015

OTHER PUBLICATIONS

International Search Report issued in corresponding International Application PCT/EP2021/053054, mailed Nov. 23, 2021.

* cited by examiner

*Primary Examiner* — Ayodeji O Ayotunde
(74) *Attorney, Agent, or Firm* — Burris Law, PLLC

(57) ABSTRACT

The disclosure relates to a four-port diplexer device which includes a first port configured to pass signals within a first frequency band and to block signals within a second frequency band; a second port configured to pass signals within the second frequency band and to block signals within the first frequency band; a third port configured to transmit a first signal portion of a combination of the signals received from the first port and the signals received from the second port; and a fourth port configured to transmit a second signal portion of the combination of the signals received from the first port and the signals received from the second port.

14 Claims, 9 Drawing Sheets

FOUR-PORT DIPLEXER DEVICE

CROSS-REFERENCE TO RELATED APPLICATIONS

This application is a continuation of International Application No. PCT/EP2021/053054, filed on Feb. 9, 2021. The disclosure of the above application is incorporated herein by reference.

FIELD

The present disclosure relates to a four-port diplexer device and an airborne satellite communication system comprising such four-port diplexer device.

BACKGROUND

The statements in this section merely provide background information related to the present disclosure and may not constitute prior art.

In satellite communication such as on-the-move satellite communication systems, multimedia data is transmitted from a satellite or a satellite network to vehicles, in particular, moving vehicles, e.g., airplanes, helicopters, vessels or cars. Antenna arrays are installed on the vehicles. For tracking the desired satellite, these antenna arrays are directive.

A broadband antenna array supporting both transmit (Tx) and receive (Rx) functionality (on two orthogonal polarizations) contains a feeding network to combine/split the signals of all array elements. A diplexer 110 is used to separate Tx and Rx signals from each other, which are located in different frequency bands, e.g., Rx in K frequency band (17.7 GHz-20.2 GHz) and Tx in Ka frequency band (27.5 GHz-30.0 GHz).

The feeding network is typically realized as an additional tree structure, using T-junction (3 port device) based power combiners/power splitters 114 to add/split all single element signals from/to a common port 105, as shown in FIG. 1. Typically, after/before the main combiner/splitter stage 114 depicted in FIG. 1, which connects both halves of an antenna array, a separate diplexer device 110 is connected to the antenna system which requires a certain amount of construction volume. The connection between the first/last traditional T-junction power combiner/splitter 114 and the traditional T-junction diplexer 110 is realized as an extra transmission line 113.

SUMMARY

This section provides a general summary of the disclosure and is not a comprehensive disclosure of its full scope or all of its features.

The present disclosure provides techniques for efficiently and reliably connecting an antenna array. In particular, this disclosure integrates a diplexer into a feeding network of an antenna array in a very compact way such that no extra construction volume for the diplexer is needed.

The present disclosure provides reliable and efficient satellite communications, in particular, for on-the-move satellite communication systems, in which multimedia data is transmitted from a satellite network to moving vehicles, such as airplanes, helicopters, vessels or cars.

A basic idea of this disclosure is to solve the above problems by creating a novel four-port diplexer device. Instead of the traditional three-port T-junction design with one central port, the new device uses two central ports which act as a power combiner/power splitter, thereby deleting the necessity of an interconnecting transmission line. The new design is therefore extremely compact and can be entirely integrated inside a common feeding layer of an antenna array.

One form presented in this disclosure can use a realization in E-plane hollow waveguide technology. Alternatively, a similar form can be realized in H-plane waveguide technology or any other transmission line technology. The form presented hereinafter may be based on using a symmetric power split/combine ratio or alternatively using an asymmetric power split/combine ratio by modifying the central two port section accordingly.

A waveguide as described in this disclosure is a structure that guides waves, such as electromagnetic waves, with minimal loss of energy by restricting the transmission of energy to one direction.

A 3-port diplexer as described in this disclosure is a passive device that implements frequency-domain multiplexing. Two ports (e.g., L and H) are multiplexed onto a third port, also called common port (e.g., C). The signals on ports L and H occupy disjoint frequency bands. Consequently, the signals on L and H can coexist on port C without interfering with each other. Typically, the signal on port L will occupy a single low frequency band and the signal on port H will occupy a higher frequency band. In that situation, the diplexer consists of a lowpass filter connecting ports L and C and high pass filter connecting ports H and C. Ideally, all the low-band signal power on port L is transferred to the C port and vice versa. All the high-band signal power on port H is transferred to port C and vice versa. Ideally, the separation of the signals is complete. None of the low band signal is transferred from the L port to the H port. In the real world, some power will be lost, and some signal power will leak to the wrong port.

Power dividers (also power splitters and, when used in reverse, power combiners) as described in this disclosure are passive devices used mostly in the field of radio technology. They couple a defined amount of the electromagnetic power in a transmission line to a port enabling the signal to be used in another circuit.

A four-port diplexer device as described in this disclosure is a new device that integrates the functionalities of a 3-port diplexer and a power combiner/power splitter in one device.

According to a first aspect, the disclosure relates to a four-port diplexer device, comprising: a first port configured to pass signals within a first frequency band and to block signals within a second frequency band; a second port configured to pass signals within the second frequency band and to block signals within the first frequency band; a third port configured to transmit a first signal portion of a combination of the signals received from the first port and the signals received from the second port; and a fourth port configured to transmit a second signal portion of the combination of the signals received from the first port and the signals received from the second port.

Such a four-port diplexer device provides a technique for efficiently and reliably connecting an antenna array. The four-port diplexer device integrates a diplexer into a feeding network of an antenna array in a very compact way such that no extra construction volume for the diplexer is needed. The specific advantage over the existing solution as shown in FIG. 1 is a reduction of construction volume, system weight and improvement of antenna efficiency by lower ohmic losses due to shorter transmission line lengths.

An antenna array and the combination of antenna signals is only one exemplary application of the present disclosure. Generally, the four-port diplexer can combine and frequency-multiplex signals—not only antenna signals. The present disclosure itself could be used in other applications as well, e.g., wired communication systems.

In an exemplary implementation of the four-port diplexer device, the first port is configured to pass first frequency components of the combined signals received by the third port and the fourth port, which first frequency components are within the first frequency band, and to block second frequency components of the combined signals received by the third port and the fourth port which second frequency components are within the second frequency band; and wherein the second port is configured to block the first frequency components of the combined signals received by the third port and the fourth port, and to pass the second frequency components of the combined signals received by the third port and the fourth port.

This provides the advantage that the two functionalities of a diplexer and a power combiner/splitter can be integrated in a single device, thereby saving space by avoiding the connection of a diplexer with a power combiner/splitter with an external transmission line.

In an exemplary implementation of the four-port diplexer device, the third port is configured to split a power of the combination of the signals received from the first port and the second port to obtain the first signal portion; and the fourth port is configured to split a power of the combination of the signals received from the first port and the second port to obtain the second signal portion.

This provides the advantage that power splitting can be applied on the combined signals from the first port and the second port, i.e. the diplexer signals.

In an exemplary implementation of the four-port diplexer device, the four-port diplexer device is configured to combine a power of the signals received by the third port and the signals received by the fourth port to provide the combined signals received by the third port and the fourth port to the first port and the second port.

This provides the advantage that diplexing, i.e. frequency-domain multiplexing, by the first port and the second port can be applied on the power combined signals from the third port and the fourth port.

In an exemplary implementation of the four-port diplexer device, the first port comprises a first filter configured to pass signals within the first frequency band and to block signals within the second frequency band; and the second port comprises a second filter configured to pass signals within the second frequency band and to block signals within the first frequency band.

This provides the advantage that frequency-domain multiplexing can be efficiently performed by the first filter and the second filter.

In an exemplary implementation of the four-port diplexer device, the first filter comprises a low pass filter or a first band pass filter; and the second filter comprises a high pass filter or a second band pass filter.

This provides the advantage that the four-port diplexer device can be flexibly designed. Depending on the frequency ranges of the first frequency band and the second frequency band, different implementations of a high-pass filter, low-pass filter or band-pass filter can be applied. For example, the low-pass filter may be implemented as a sixth-order low pass filter. For example, the high-pass filter may be implemented by stepped taperings.

In an exemplary implementation of the four-port diplexer device, the signals within the first frequency band are signals received from a satellite; and the signals within the second frequency band are signals for transmission to the satellite.

This provides the advantage that the four-port diplexer device can be efficiently applied in a satellite communications system, in particular an on-the-move satellite communications system.

In an exemplary implementation of the four-port diplexer device, the first frequency band is a K-band and the second frequency band is a Ka-band or vice versa.

This provides the advantage that the four-port diplexer device can be efficiently applied in a satellite communications system, in particular a satellite communications system in which signals are received in the K frequency band and transmitted in a Ka frequency band.

In an exemplary implementation of the four-port diplexer device, the four-port diplexer device is shaped as a cross having four arms, wherein the first port, the second port, the third port and the fourth port are formed at respective end sections of the four arms, wherein the first port and the second port are arranged at two opposite end sections of the cross; and wherein the third port and the fourth port are arranged at the other two opposite end sections of the cross.

This provides the advantage that the four-port diplexer device provides a compact design that can be used to replace two separate devices of diplexer and power combiner/splitter, thereby saving construction space.

In an exemplary implementation of the four-port diplexer device, the arms of the cross, at which end sections the third and the fourth port are formed, are symmetrically shaped to provide symmetric power splitting and combining at the third port and the fourth port.

This provides the advantage that the four-port diplexer device can provide symmetric power splitting and combining at the third port and the fourth port.

In an exemplary implementation of the four-port diplexer device, the arms of the cross, at which end sections the third and the fourth port are formed, are asymmetrically shaped to provide asymmetric power splitting and combining at the third port and the fourth port.

This provides the advantage that the four-port diplexer device can provide asymmetric power splitting and combining at the third port and the fourth port. The asymmetry in the different arms can be adapted to the design of an antenna array, for example.

In an exemplary implementation of the four-port diplexer device, an arm of the cross, at which end section the third port is formed, has a smaller cross-section than an arm of the cross, at which end section the fourth port is formed, in order to implement a different power ratio between the first signal portion of the signals and the second signal portion of the signals.

This provides the advantage that a different power ratio between the first signal portion of the signals and the second signal portion of the signals can be provided. The four-port diplexer device can be used for example in asymmetric antenna arrays with asymmetric distribution of antenna elements to antenna array branches.

In an exemplary implementation of the four-port diplexer device, the arms of the cross, at which end sections the third and the fourth port are formed, comprise a matching section at which a cross-section of the respective arm is smaller than at a remaining section of the arm.

This provides the advantage that the signals can be efficiently matched to two branches of an antenna array.

In an exemplary implementation of the four-port diplexer device, the four-port diplexer device is integrally formed as a single unit.

This provides the advantage that the four-port diplexer device can be realized very robust. Besides, the integrally formed single unit avoids distortions in transmission of the signals.

In an exemplary implementation of the four-port diplexer device, the four-port diplexer device is implemented in E-plane hollow waveguide technology or in H-plane hollow waveguide technology.

This provides the advantage that depending on the available construction restrictions, different technologies can be applied. Other technologies may be applied as well, e.g. strip line technology, etc.

According to a second aspect, the disclosure relates to an airborne satellite communication system, comprising: the four-port diplexer device according to the previous description; an antenna array comprising a first branch of antenna elements coupled to the third port of the four-port diplexer device and a second branch of antenna elements coupled to the fourth port of the four-port diplexer device; and a multi-axis positioner configured to permanently align the antenna array to a given target satellite.

Such an airborne satellite communication system using the above described four-port diplexer device provides the advantage of reliable and efficient satellite communications, in particular, for on-the-move satellite communication systems, in which multimedia data is transmitted from a satellite network to moving vehicles, such as airplanes, helicopters, vessels or cars. Due to the saved space by the implementation of the four-port diplexer device, the antenna array with the four-port diplexer device can be efficiently mounted on a rear wing or a central wing or at another location of the airplane. By avoiding the extra transmission line between diplexer and power combiner/splitter, material and hence weight can be saved, thereby increasing the flight distance of the airplane.

Further implementations of the four-port diplexer device according to the first aspect as described above can be analogously applied to the four-port diplexer device according to the third aspect.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
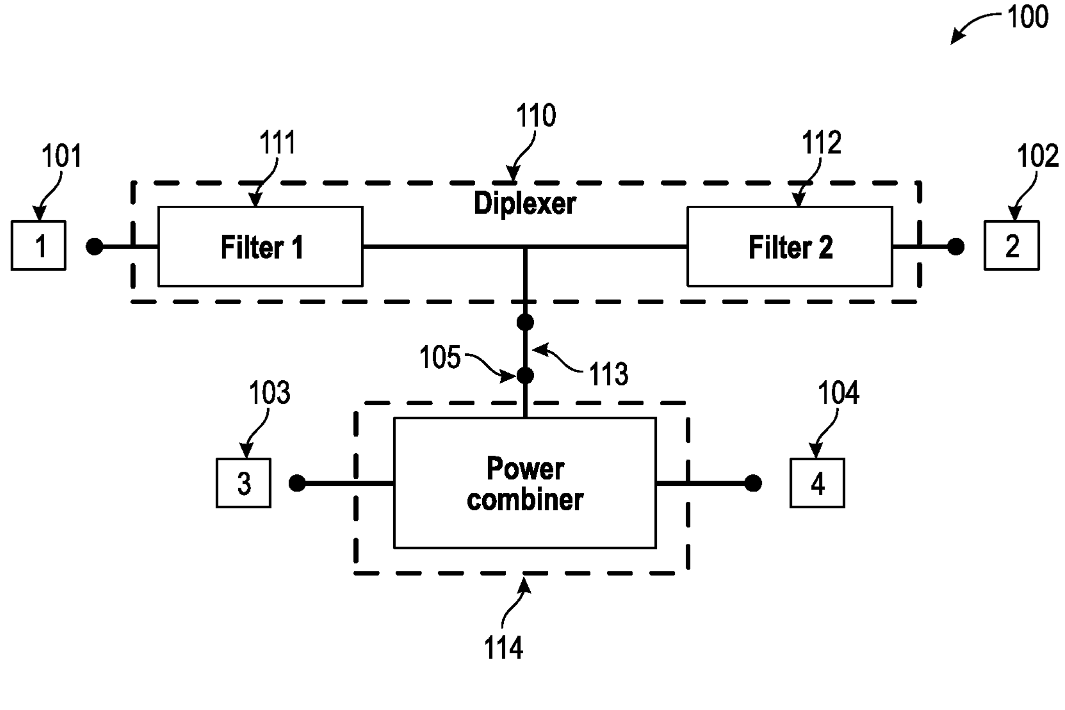
FIG. 1 shows a schematic diagram illustrating the typical structure of a 3-port diplexer combined with a power combiner by a transmission line according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic diagram illustrating the typical structure 100 of a 3-port diplexer combined with a power combiner by a transmission line.

A broadband antenna array supporting both transmit (Tx) and receive (Rx) functionality (on two orthogonal polarizations) contains a feeding network to combine/split the signals of all array elements. A diplexer 110 is used to separate Tx and Rx signals from each other, which are located in different frequency bands, e.g., Rx in K frequency band (17.7 GHz-20.2 GHz) and Tx in Ka frequency band (27.5 GHz-30.0 GHz). The feeding network is typically realized as an additional tree structure, using T-junction (3 port device) based power combiners/power splitters 114 to add/split all single element signals from/to a common port 105. Typically, after/before the main combiner/splitter stage 114, which connects both halves of an antenna array, a separate diplexer device 110 is connected to the antenna system which requires a certain amount of construction volume. The connection between the first/last traditional T-junction power combiner/splitter 114 and the traditional T-junction diplexer 110 is realized as an extra transmission line 113.

The diplexer 110 is a three-port device with a first port 101, a second port 102 and a common port 105. In the diplexer 110, a first filter 111 is arranged in the branch of the first port 101 and a second filter 112 is arranged in the branch of the second port 102. The power combiner/power splitter 114 is also a three-port device with a first port 103, a second port 104 and a common port 105. The common ports of diplexer 110 and power combiner/power splitter 114 are connected by a transmission line 113.

Figure 2:
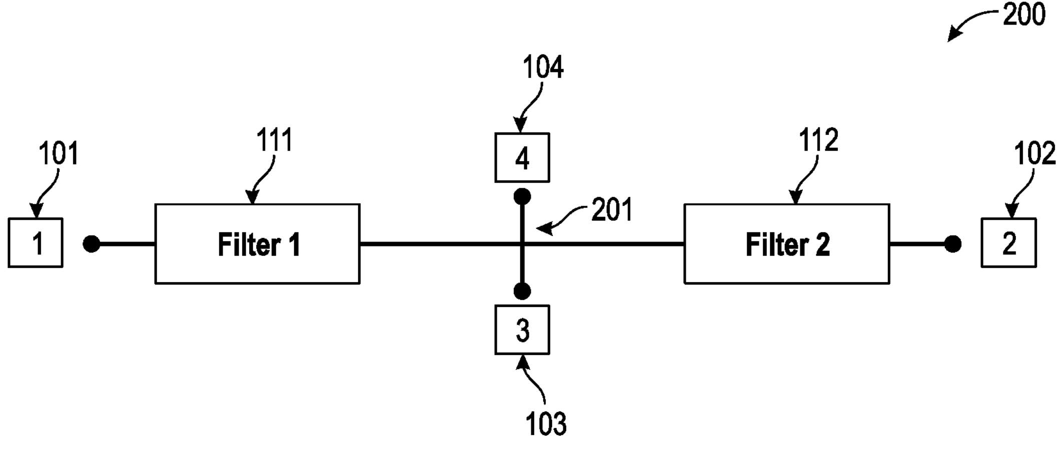
FIG. 2 shows a schematic diagram illustrating a four-port diplexer device according to the disclosure.

FIG. 2 shows a schematic diagram illustrating a four-port diplexer device 200 according to the disclosure.

While the structure of FIG. 1 consists of two independent parts, i.e. the power combiner 114 and the diplexer 110, in the solution according to the disclosure presented in FIG. 2, the power combiner is an integral part of a diplexer, that is realized as a four-port diplexer device 200.

The four-port diplexer device 200 comprises four ports 101, 102, 103, 104. A first port 101 is configured to pass signals within a first frequency band, e.g. a K frequency band (17.7 GHz-20.2 GHz) and to block signals within a second frequency band, e.g. a Ka frequency band (27.5 GHz-30.0 GHz). A second port 102 is configured to pass signals within the second frequency band and to block signals within the first frequency band. A third port 103 is configured to transmit a first signal portion of a combination of the signals received from the first port 101 and the signals received from the second port 102. The fourth port 104 is configured to transmit a second signal portion of the combination of the signals received from the first port 101 and the signals received from the second port 102.

Figure 9:
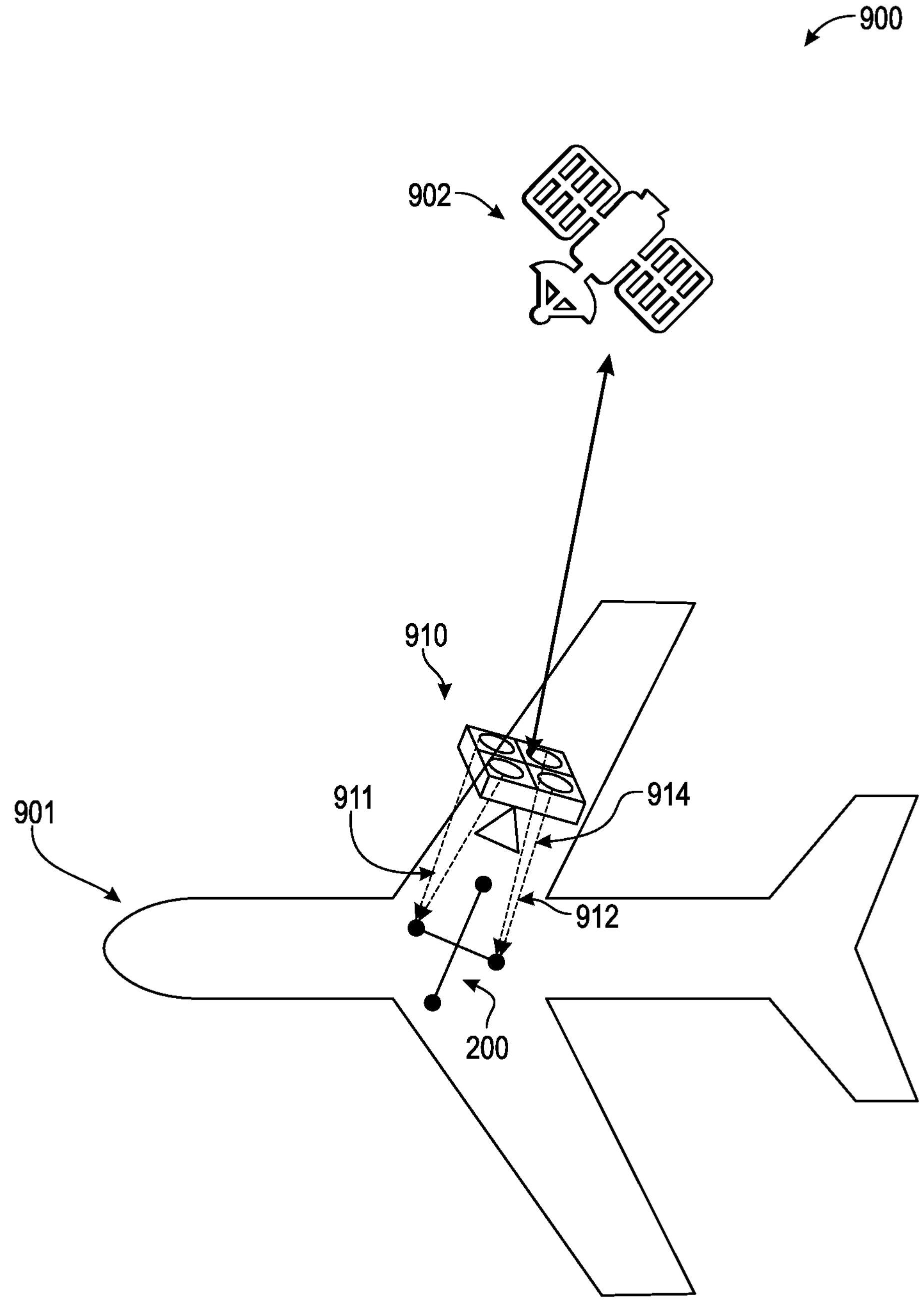
FIG. 9 shows a schematic diagram illustrating an airborne satellite communication system according to the disclosure.

An example of an antenna array 910 with exemplary first branch 911 and second branch 912 is shown in the communication system 900 depicted in FIG. 9. The first branch 911 connects a first portion of antenna elements of the antenna array 910 while the second branch 912 connects a second portion of antenna elements of the antenna array 910. In one example, the first branch 911 and the second branch 912 may connect two halves of the antenna array elements. In an alternative example, the first branch 911 and the second branch 912 may connect different portions of the antenna elements. In an example, the first branch 911 and the second branch 912 together may connect only a part of the whole antenna elements.

Figure 6:
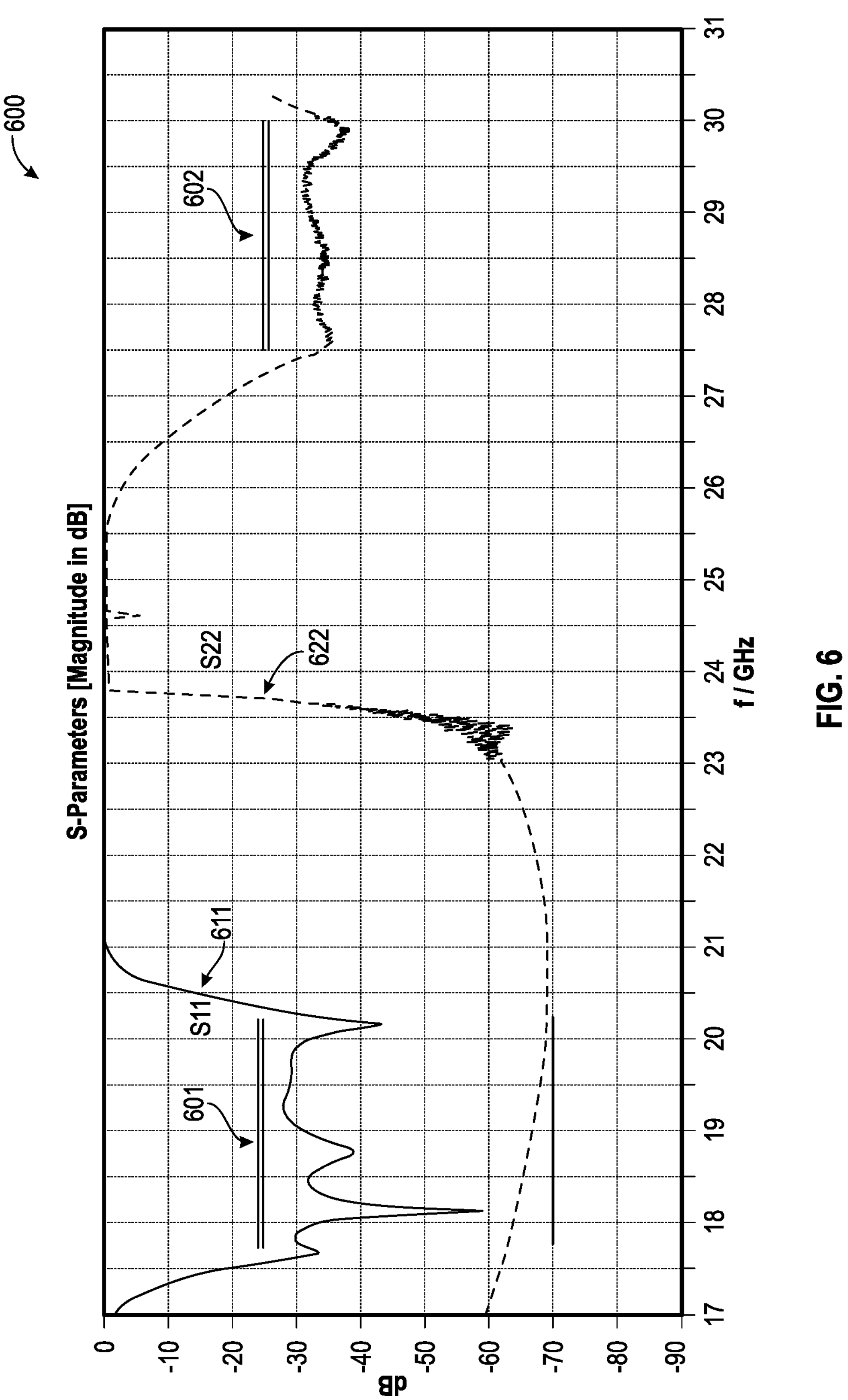
FIG. 6 shows a performance diagram illustrating S-parameters of the exemplary four-port diplexer device according to the first implementation.
Figure 7:
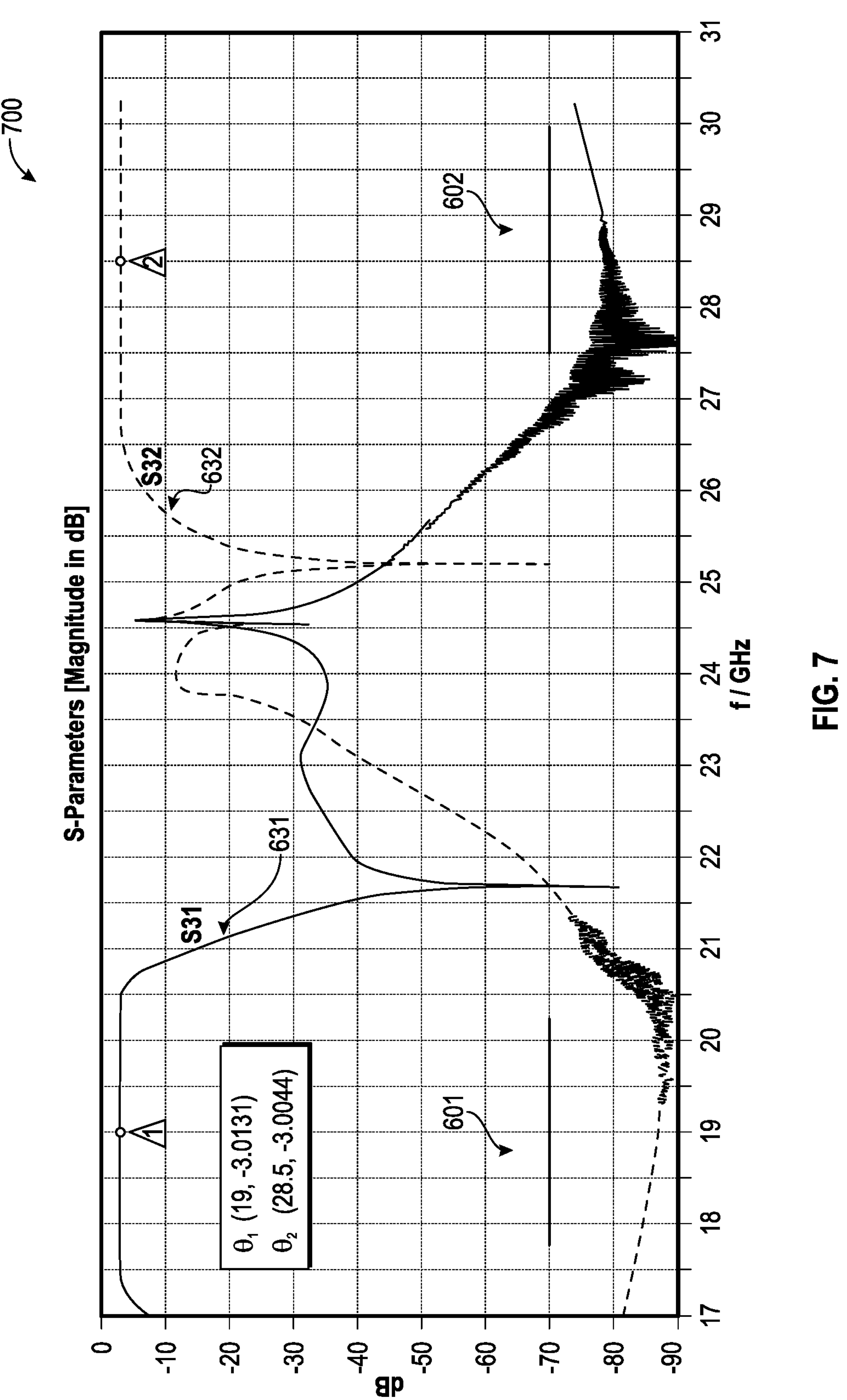
FIG. 7 shows a performance diagram illustrating S-parameters of the exemplary four-port diplexer device according to the first implementation.
Figure 8:
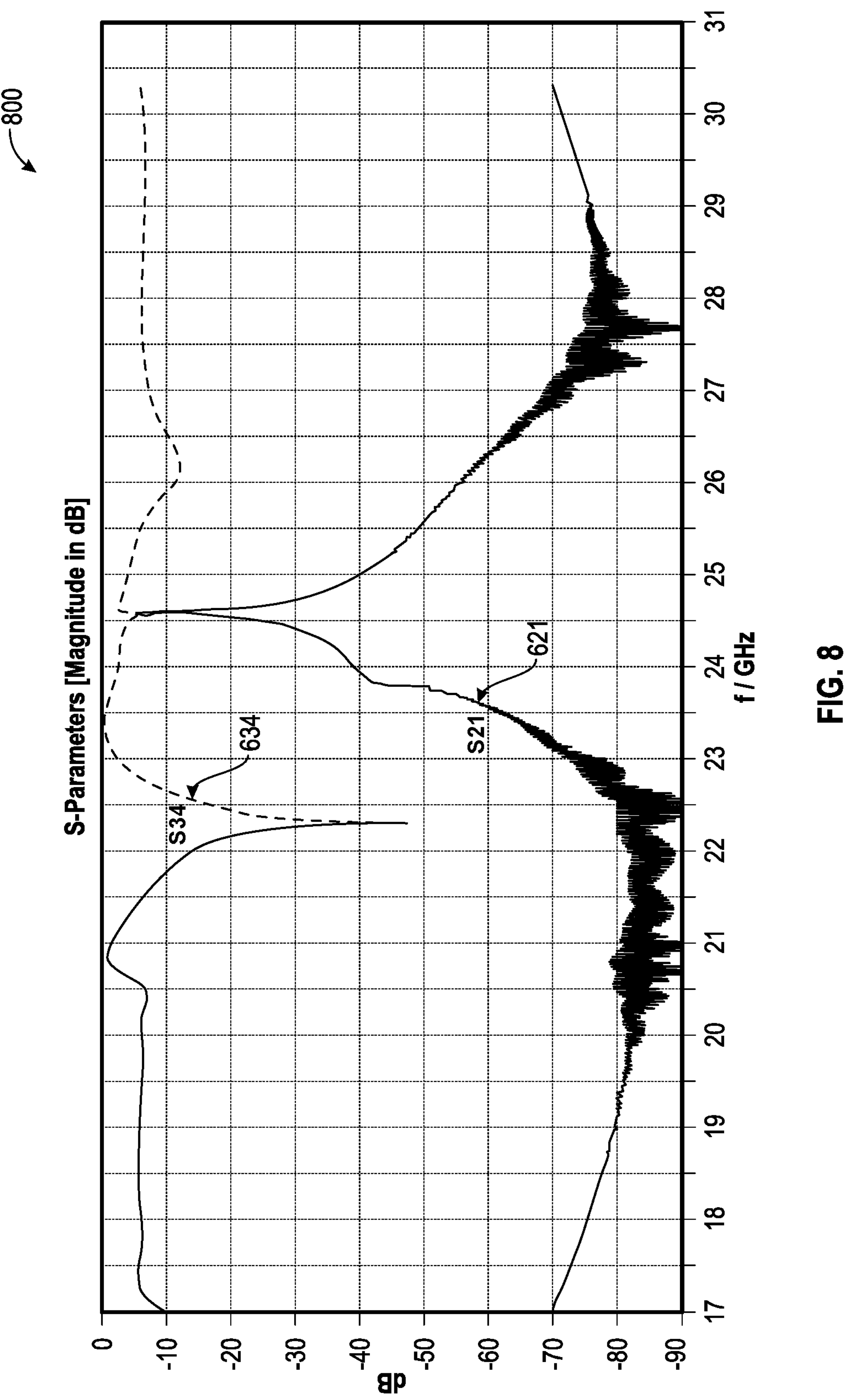
FIG. 8 shows a performance diagram illustrating S-parameters of the exemplary four-port diplexer device according to the first implementation.

The first port 101 may be configured to pass first frequency components of the combined signals received by the third port 103 and the fourth port 104, which first frequency components are within the first frequency band 601, and to block second frequency components of the combined signals received by the third port 103 and the fourth port 104 which second frequency components are within the second frequency band 602. The first frequency band 601 may be a K frequency band and the second frequency band 602 may be a Ka frequency band as shown in FIGS. 6 to 8. The second port 102 may be configured to block the first frequency components of the combined signals received by the third port 103 and the fourth port 104, and to pass the second frequency components of the combined signals received by the third port 103 and the fourth port 104.

The third port 103 may be configured to split a power of the combination of the signals received from the first port 101 and the second port 102 to obtain the first signal portion. The fourth port 104 may be configured to split a power of the combination of the signals received from the first port 101 and the second port 102 to obtain the second signal portion.

The four-port diplexer device 200 may be configured to combine a power of the signals received by the third port 103 and the signals received by the fourth port 104 to provide the combined signals received by the third port 103 and the fourth port 104 to the first port 101 and the second port 102.

The first port 101 may comprise a first filter 111 configured to pass signals within the first frequency band 601 and to block signals within the second frequency band 602. The second port 102 may comprise a second filter 112 configured to pass signals within the second frequency band 602 and to block signals within the first frequency band 601.

The first filter 111 may comprise a low pass filter or a first band pass filter, e.g. a low pass filter which cut-off frequency is above the first frequency band 601 or a band pass filter which passes frequency components in the first frequency band 601 and blocks frequency components in the second frequency band 602. The second filter 112 may comprise a high pass filter or a second band pass filter, e.g. a high pass filter which cut-off frequency is below the second frequency band 602 or a band pass filter which passes frequency components in the second frequency band 602 and blocks frequency components in the first frequency band 601.

The signals within the first frequency band 601 may be signals received from a satellite 902, e.g. as shown in FIG. 9. The signals within the second frequency band 602 may be signals for transmission to the satellite 902 or satellite network.

As described above, the first frequency band 601 can be a K-band and the second frequency band 602 can be a Ka-band or vice versa.

Figure 3:
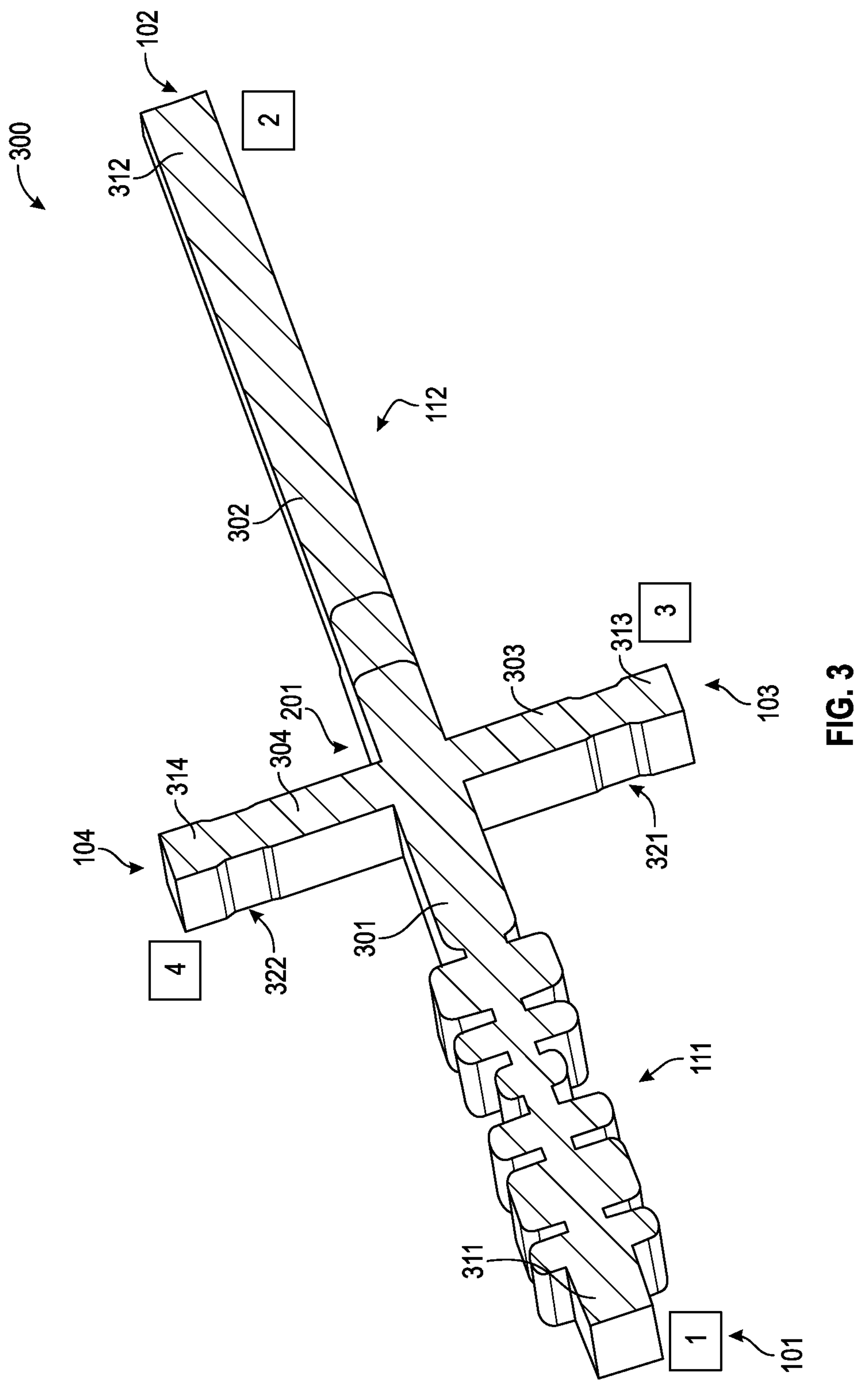
FIG. 3 shows a perspective view of an exemplary four-port diplexer device according to a first implementation.

FIG. 3 shows a perspective view of an exemplary four-port diplexer device 300 according to a first implementation. The four-port diplexer device 300 is of the same structure as the four-port diplexer device 200 described above with respect to FIG. 2. The four-port diplexer device 300 implements a waveguide diplexer with integrated power combiner/splitter.

The four-port diplexer device 300 comprises four ports 101, 102, 103, 104 as described above with respect to FIG. 2. The first port 101 is configured to pass signals within a first frequency band 601 and to block signals within a second frequency band 602 (see FIGS. 6 to 8). The second port 102 is configured to pass signals within the second frequency band 602 and to block signals within the first frequency band 601. The third port 103 is configured to transmit a first signal portion of a combination of the signals received from the first port 101 and the signals received from the second port 102. The fourth port 104 is configured to transmit a second signal portion of the combination of the signals received from the first port 101 and the signals received from the second port 102.

As described above with respect to FIG. 2, the first port 101 may be configured to pass first frequency components of the combined signals received by the third port 103 and the fourth port 104, which first frequency components are within the first frequency band 601, and to block second frequency components of the combined signals received by the third port 103 and the fourth port 104 which second frequency components are within the second frequency band 602. The second port 102 may be configured to block the first frequency components of the combined signals received by the third port 103 and the fourth port 104, and to pass the second frequency components of the combined signals received by the third port 103 and the fourth port 104.

As described above with respect to FIG. 2, the third port 103 may be configured to split a power of the combination of the signals received from the first port 101 and the second port 102 to obtain the first signal portion. The fourth port 104 may be configured to split a power of the combination of the signals received from the first port 101 and the second port 102 to obtain the second signal portion.

The four-port diplexer device 300 may be configured to combine a power of the signals received by the third port 103 and the signals received by the fourth port 104 to provide the combined signals received by the third port 103 and the fourth port 104 to the first port 101 and the second port 102.

As described above with respect to FIG. 2, the first port 101 may comprise a first filter 111 configured to pass signals within the first frequency band 601 and to block signals within the second frequency band 602. The second port 102 may comprise a second filter 112 configured to pass signals within the second frequency band 602 and to block signals within the first frequency band 601.

The four-port diplexer device 300 may be shaped as a cross 201 having four arms 301, 302, 303, 304. The first port 101, the second port 102, the third port 103 and the fourth port 104 may be formed at respective end sections 311, 312, 313, 314 of the four arms. The first port 101 and the second port 102 may be arranged at two opposite end sections 311, 312 of the cross 201. The third port 103 and the fourth port 104 may be arranged at the other two opposite end sections 313, 314 of the cross 201.

The arms 303, 304 of the cross 201, at which end sections 313, 314 the third port 103 and the fourth port 104 are formed, may be symmetrically shaped to provide a symmetric power splitting and combining at the third port 103 and the fourth port 104. The symmetry can be around a symmetry axis formed between the third port 103 and the fourth port 104. The symmetry can also be around a symmetry axis formed between the first port 101 and the second port 102. The other arms 301, 302 may be unsymmetrically formed due to the usage of the first filter 111 and the second filter 112.

The arms 303, 304 of the cross 201, at which end sections 313, 314 the third port 103 and the fourth port 104 are formed, comprise a matching section 321, 322 at which a cross-section of the respective arm is smaller than at a remaining section of the arm.

The four-port diplexer device 300 may be integrally formed as a single unit, e.g. formed of the same metal block or formed as a single piece of wave guiding material.

The four-port diplexer device 300 may be implemented in E-plane hollow waveguide technology or in H-plane hollow waveguide technology or any other technology for guiding signals, e.g. in strip line technology.

Figure 4:
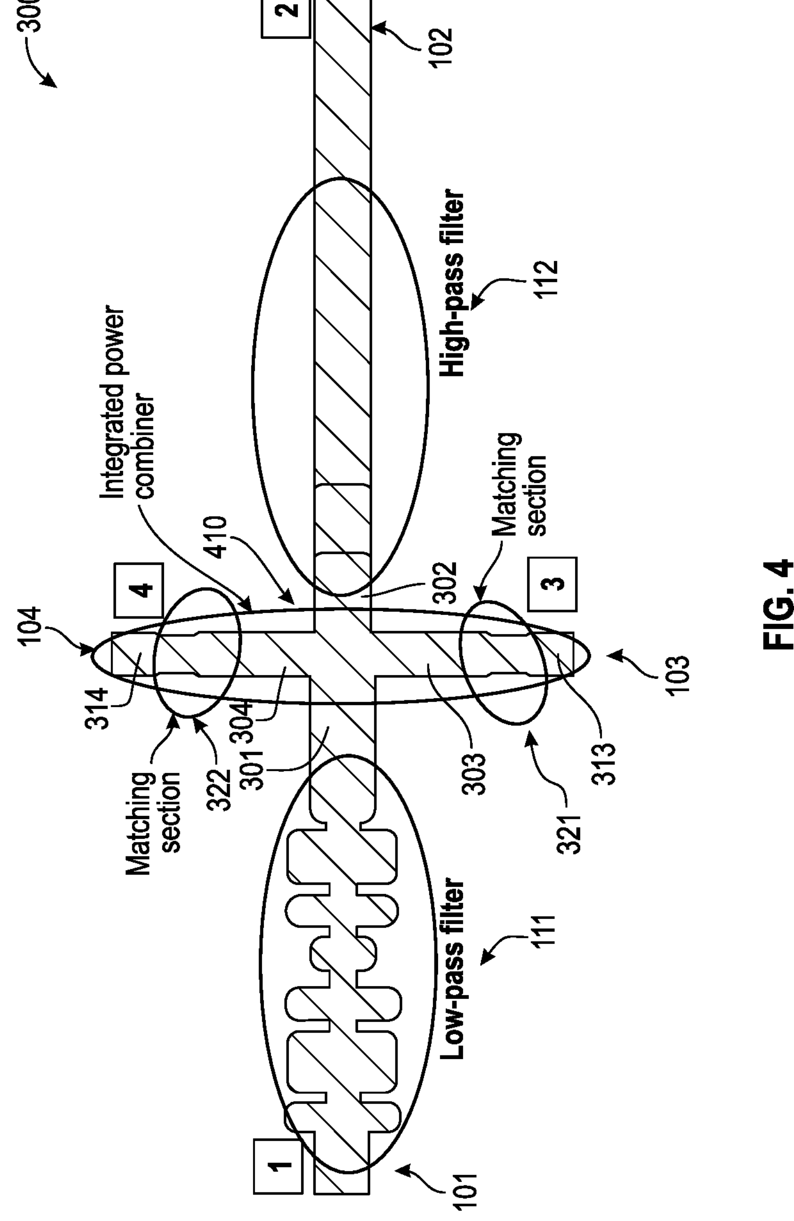
FIG. 4 shows a schematic diagram illustrating the structure of the exemplary four-port diplexer device according to the first implementation.

FIG. 4 shows a schematic diagram illustrating the structure of the exemplary four-port diplexer device 300 according to the first implementation. The four-port diplexer device 300 is of the same structure as the four-port diplexer device 200 described above with respect to FIG. 2. The four-port diplexer device 300 implements a waveguide diplexer with integrated power combiner/splitter 410. The left part shows the low-pass filter 111, the right part shows the high-pass filter 112, while the middle part shows the integrated power combiner/splitter 410.

As described above, the four-port diplexer device 300 can be shaped as a four-armed cross 201 with the four arms 301, 302, 303, 304. As can be seen in FIG. 4, the first port 101, the second port 102, the third port 103 and the fourth port 104 may be formed at respective end sections 311, 312, 313, 314 of the four arms. The first port 101 and the second port 102 may be arranged at two opposite end sections 311, 312 of the cross 201. The third port 103 and the fourth port 104 may be arranged at the other two opposite end sections 313, 314 of the cross 201.

The arms 303, 304 of the cross 201, at which end sections 313, 314 the third port 103 and the fourth port 104 are formed, may be symmetrically shaped to provide a symmetric power splitting and combining at the third port 103 and the fourth port 104. The other arms 301, 302 may be unsymmetrically formed due to the usage of the low-pass filter 111 and the high-pass filter 112.

The arms 303, 304 of the cross 201, at which end sections 313, 314 the third port 103 and the fourth port 104 are formed, comprise a matching section 321, 322 at which a cross-section of the respective arm is smaller than at a remaining section of the arm. The matching sections 321, 322 can be used to adapt the signals transmitted by or received from the third port 103 and the fourth port 104. The matching may be implemented according to a respective branch of the antenna array. The third port 103 and the fourth port 104 represent the two central ports of the device 300.

As described above with respect to FIG. 3, the four-port diplexer device 300 may be integrally formed as a single unit, e.g. formed of the same metal block or formed as a single piece of wave guiding material.

The S-parameter charts 600, 700, 800 shown in FIGS. 6, 7 and 8 demonstrate that the four-port diplexer device 300 has the same performance of both diplexer and power combiner.

Figure 5:
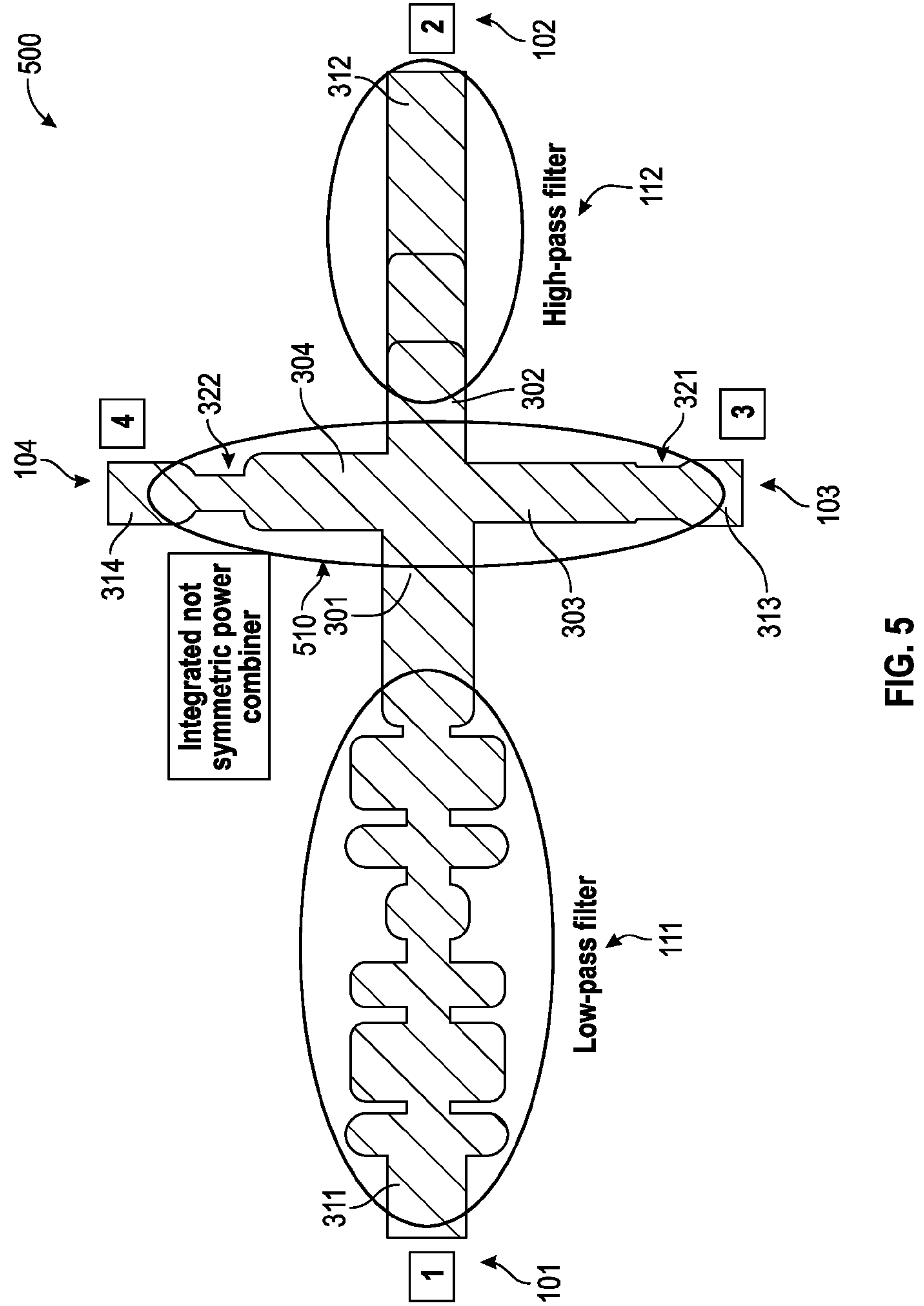
FIG. 5 shows a schematic diagram illustrating the structure of an exemplary four-port diplexer device according to a second implementation.

FIG. 5 shows a schematic diagram illustrating the structure of an exemplary four-port diplexer device 500 according to a second implementation. The four-port diplexer device 500 is of the same structure as the four-port diplexer device 200 described above with respect to FIG. 2. The four-port diplexer device 500 implements a waveguide diplexer with integrated power combiner/splitter. Compared to the device 300 described above with respect to FIGS. 3 and 4, the four-port diplexer device 500 shown in FIG. 5 has an asymmetric structure of the integrated power combiner/splitter 510.

As described above, the four-port diplexer device 500 can be shaped as a four-armed cross 201 with the four arms 301, 302, 303, 304.

The arms 303, 304 of the cross 201, at which end sections 313, 314 the third port 103 and the fourth port 104 are formed, may be asymmetrically shaped to provide an asymmetric power splitting and combining at the third port 103 and the fourth port 104.

An arm 303 of the cross 201, at which end section 313 the third port 103 is formed, has a smaller cross-section than an arm 304 of the cross 201, at which end section 314 the fourth port 104 is formed, in order to implement a different power ratio between the first signal portion of the signals and the second signal portion of the signals.

FIG. 6 shows a performance diagram 600 illustrating S-parameters S11 and S22 of the exemplary four-port diplexer device 300 according to the first implementation.

Graph 611 shows the S11 parameter indicating return loss of the four-port diplexer device 300 at the first port 101. Graph 622 shows the S22 parameter indicating return loss of the four-port diplexer device 300 at the second port 102.

Graph 611 shows that the four-port diplexer device 300 is optimally adapted to the first frequency band 601 which is in this example Rx in K frequency band (17.7 GHz-20.2 GHz). In this first frequency band 601, a return loss at the first port 101 in the range of about −30 dB can be achieved.

Graph 622 shows that the four-port diplexer device 300 is also optimally adapted to the second frequency band 602 which is in this example Tx in Ka frequency band (27.5 GHz-30.0 GHz). In this second frequency band 602, a return loss at the second port 102 in the range of below −30 dB can be achieved.

FIG. 7 shows a performance diagram 700 illustrating S-parameters S31 and S32 of the exemplary four-port diplexer device 300 according to the first implementation.

Graph 631 shows the S31 parameter indicating transmission of the four-port diplexer device 300 from first port 101 to third port 103. Graph 632 shows the S32 parameter indicating transmission of the four-port diplexer device 300 from second port 102 to third port 103.

Graph 631 shows that the four-port diplexer device 300 is optimally adapted to the first frequency band 601 which is in this example the K frequency band (17.7 GHz-20.2 GHz). In this first frequency band 601, a transmission of about −3 dB can be achieved while in the second frequency band 602, which is in this example the Ka frequency band (27.5 GHz-30.0 GHz), transmission is inhibited by about −70 dB and below.

Graph 632 shows that the four-port diplexer device 300 is also optimally adapted to the second frequency band 602 in which a transmission of about −3 dB can be achieved while in the first frequency band 601 transmission is inhibited by about −80 dB and below.

FIG. 8 shows a performance diagram 800 illustrating S-parameters S21 and S34 of the exemplary four-port diplexer device 300 according to the first implementation.

Graph 621 shows the S21 parameter indicating transmission, i.e. isolation respectively, of the four-port diplexer device 300 from first port 101 to second port 102. Graph 634 shows the S34 parameter indicating transmission, i.e. isolation respectively, of the four-port diplexer device 300 from fourth port 104 to third port 103.

Isolation between the first port 101 and the second port 102 is at about −70 dB to −80 dB in both relevant frequency bands 601, 602. The third port 103 and the fourth port 104 are the central ports. Isolation between these ports is not relevant. However, in this example isolation between the third port 103 and the fourth port 104 is nearly constant at −6 dB in both relevant frequency bands 601, 602.

FIG. 9 shows a schematic diagram illustrating an airborne satellite communication system 900 according to the disclosure.

The airborne satellite communication system 900 comprises an antenna array 910 which two halves or branches 911, 912 are connected to a four-port diplexer device 200 as described above with respect to FIGS. 2 to 8. The airborne satellite communication system 900 further comprises a multi-axis positioner 914 configured to permanently align the antenna array 910 to a given target satellite 902. A processor or controller may be used to align the antenna array 910 to the satellite 902. The position of the satellite 902 may be detected by receiving a signal from the satellite. The processor may align the multi-axis positioner 914 based on the determined satellite position.

The multi-axis positioner 914 and the antenna array 910 may be mounted at an airplane 901, for example, at a front wing or a rear wing of the airplane 901.

The antenna array 910 itself is used as a part of the on-the-move satellite communication system 900 based on a multi-axis positioner 914 (e.g., azimuth, elevation, skew), permanently aligning the antenna 910 to a given target satellite 902.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular forms, those skilled in the art recognize that many changes may be made thereto without departing from the scope of the present disclosure. It is therefore to be understood that within the scope of the appended claims and their equivalents, the present disclosure may be practiced otherwise than as specifically described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A four-port diplexer device comprising:

a first port configured to pass signals within a first frequency band and to block signals within a second frequency band;

a second port configured to pass signals within the second frequency band and to block signals within the first frequency band;

a third port configured to transmit a first signal portion of a combination of the signals received from the first port and the signals received from the second port; and a fourth port configured to transmit a second signal portion of the combination of the signals received from the first port and the signals received from the second port, wherein the four-port diplexer device is shaped as a cross having four arms, wherein the first port, the second port, the third port and the fourth port are formed at respective end sections of the four arms, wherein the first port and the second port are arranged at two opposite end sections of the cross; and wherein the third port and the fourth port are arranged at the other two opposite end sections of the cross.

2. The four-port diplexer device of claim 1, wherein the first port is configured to pass first frequency components of combined signals received by the third port and the fourth port, which first frequency components are within the first frequency band, and to block second frequency components of the combined signals received by the third port and the fourth port which second frequency components are within the second frequency band; and wherein the second port is configured to block the first frequency components of the combined signals received by the third port and the fourth port, and to pass the second frequency components of the combined signals received by the third port and the fourth port.

3. The four-port diplexer device of claim 1, wherein the third port is configured to split a power of the combination of the signals received from the first port and the second port to obtain the first signal portion; and wherein the fourth port is configured to split a power of the combination of the signals received from the first port and the second port to obtain the second signal portion.

4. The four-port diplexer device of claim 1, wherein the four-port diplexer device is configured to combine a power of the signals received by the third port and the signals received by the fourth port to provide the combined signals received by the third port and the fourth port to the first port and the second port.

5. The four-port diplexer device of claim 1, wherein the first port comprises a first filter configured to pass signals within the first frequency band and to block signals within the second frequency band; and wherein the second port comprises a second filter configured to pass signals within the second frequency band and to block signals within the first frequency band.

6. The four-port diplexer device of claim 5, wherein the first filter comprises a low pass filter or a first band pass filter; and wherein the second filter comprises a high pass filter or a second band pass filter.

7. The four-port diplexer device of claim 1, wherein the signals within the first frequency band are signals received from a satellite; and wherein the signals within the second frequency band are signals for transmission to the satellite.

8. The four-port diplexer device of claim 1, wherein the arms of the cross, at which end sections the third port and the fourth port are formed, are symmetrically shaped to provide a symmetric power splitting and combining at the third port and the fourth port.

9. The four-port diplexer device of claim 1, wherein the arms of the cross, at which end sections the third port and the fourth port are formed, are asymmetrically shaped to provide an asymmetric power splitting and combining at the third port and the fourth port.

10. The four-port diplexer device of claim 9, wherein an arm of the cross, at which end section the third port is formed, has a smaller cross-section than an arm of the cross, at which end section the fourth port is formed, in order to implement a different power ratio between the first signal portion of the signals and the second signal portion of the signals.

11. The four-port diplexer device of claim 1, wherein the arms of the cross, at which end sections the third port and the fourth port are formed, comprise a matching section at which a cross-section of the respective arm is smaller than at a remaining section of the arm.

12. The four-port diplexer device of claim 1, wherein the four-port diplexer device is integrally formed as a single unit.

13. The four-port diplexer device of claim 1, wherein the four-port diplexer device is implemented in E-plane hollow waveguide technology or in H-plane hollow waveguide technology.

14. An airborne satellite communication system comprising:

the four-port diplexer device according to claim 1;

an antenna array comprising a first branch of antenna elements coupled to the third port of the four-port diplexer device and a second branch of antenna elements coupled to the fourth port of the four-port diplexer device; and a multi-axis positioner configured to permanently align the antenna array to a given target satellite.

* * * * *